Figure 1:
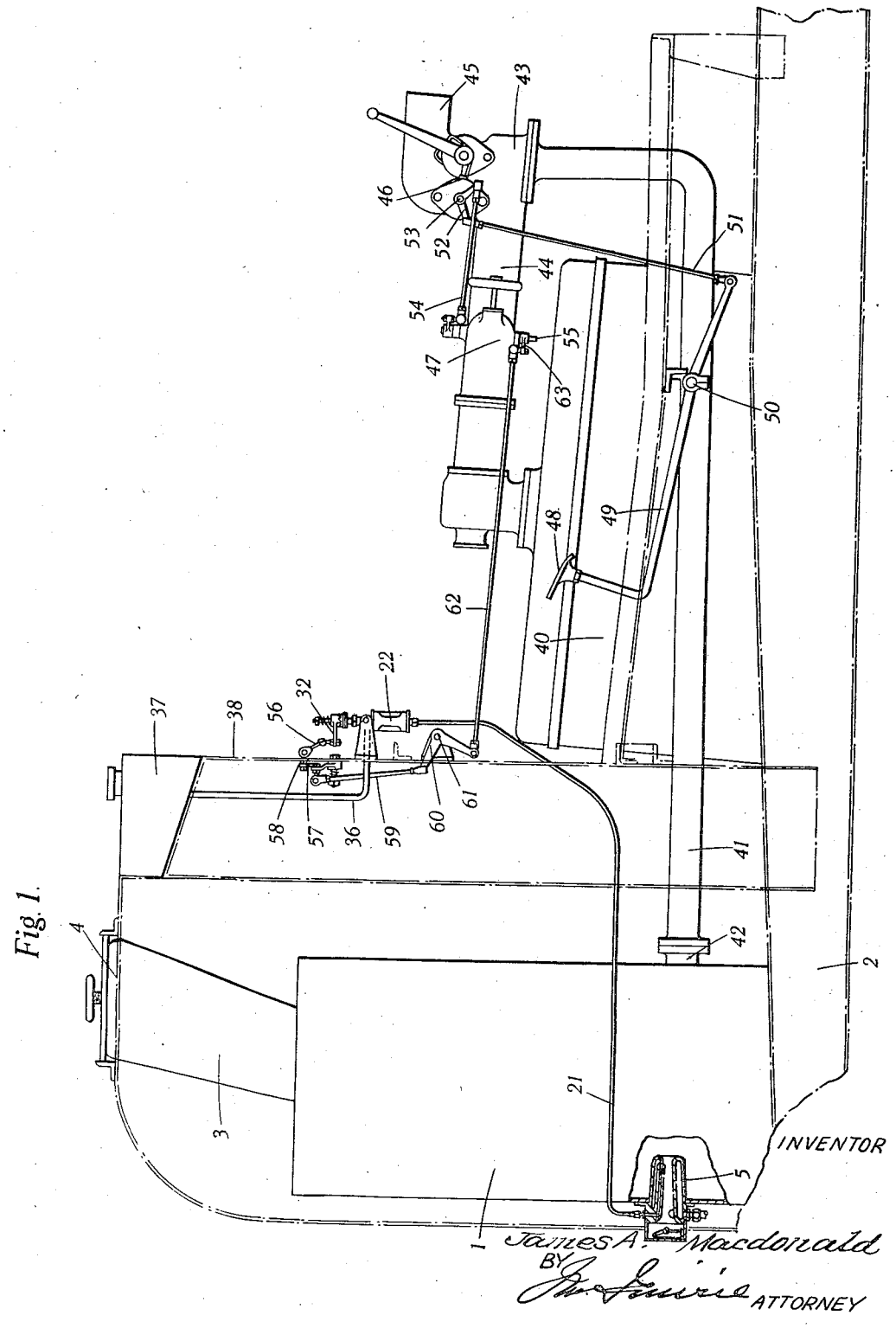

Aug. 29, 1939.  J. A. MACDONALD  2,171,184
PRODUCER GAS PLANT
Filed Oct. 6, 1937   4 Sheets-Sheet 1

INVENTOR
James A. Macdonald
BY
ATTORNEY

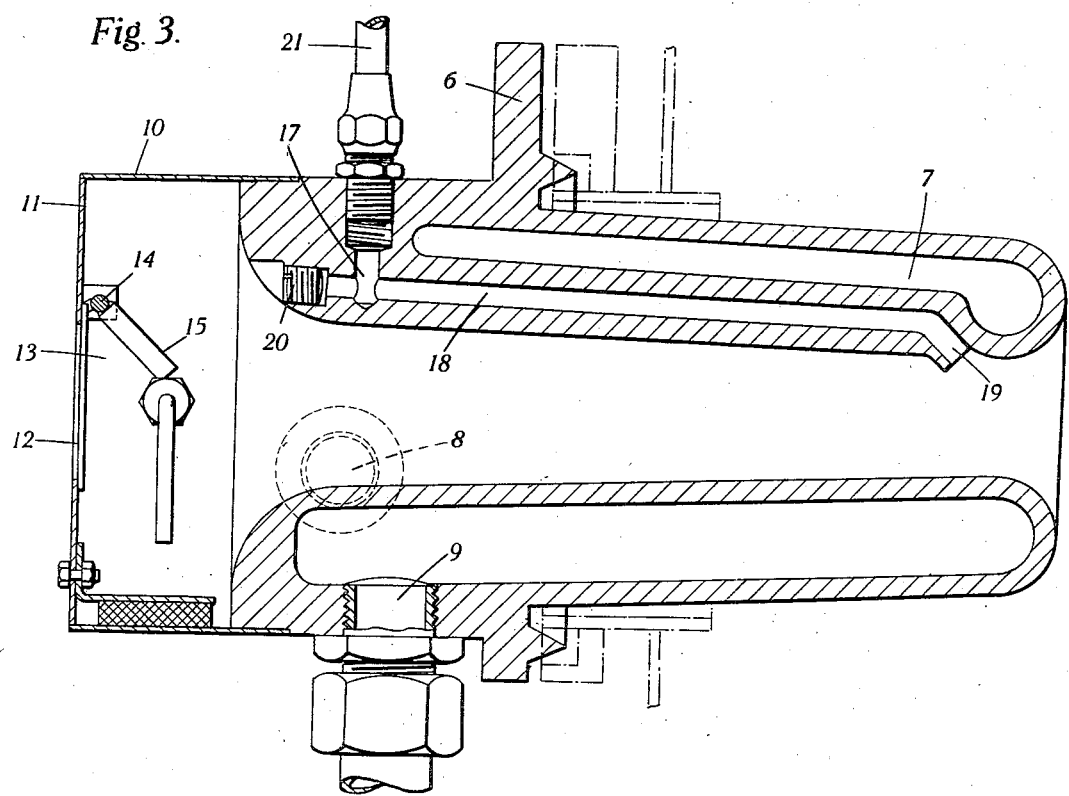

Aug. 29, 1939.　　J. A. MACDONALD　　2,171,184
PRODUCER GAS PLANT
Filed Oct. 6, 1937　　4 Sheets-Sheet 4

INVENTOR
James A. MacDonald
BY
ATTORNEY

Patented Aug. 29, 1939

2,171,184

UNITED STATES PATENT OFFICE 2,171,184

PRODUCER GAS PLANT

James Alexander Macdonald, London, England

Application October 6, 1937, Serial No. 167,646
In Great Britain October 22, 1936

7 Claims. (Cl. 123—3)

This invention relates to producer gas plants and to the utilization of producer gases for specific purposes.

The usual aim in a producer gas plant is to supply gas of uniform optimum quality.

The two extremes of quality may be represented by a pure air-gas when no water in any form is introduced and a pure water-gas when no air is supplied.

The former is an exothermic reaction yielding a gas whose calorific value may be taken as some 61 B. t. u. per cubic foot when mixed with requisite air of combustion.

The latter is an endothermic reaction giving a gas of which the lower calorific value is some 89 B. t. u. per cubic foot of mixture.

In order to avoid unnecessary heat-losses and to produce continuously what may be termed an air-water-gas of the highest calorific value that the particular form of plant and fuel employed is capable of it has been usual practice to use both air and water (in some state).

Considerable ingenuity has been shown in devising means accurately to proportion the ratio of water/air used at all demands in order to avoid debasing the gas at any demand by excess of cooling.

There are however conditions in which relatively sudden though intermittent demands occur which cannot best be met by the above methods however suited they be to continued steady output with minor variations.

For example modern traffic conditions demand of a vehicle producer-gas-driven by a portable plant a very high degree of flexibility of performance. Undue time-lag between the violently fluctuating demand of the engine for power and the resultant supply by the producer of fuel has to be avoided as far as at all possible.

The mere quantitative variation of the supply of gas of consistently good quality is not found in practice to meet the case sufficiently well even in a plant where every effort has been made to make gas as quickly as possible at highest available temperatures.

The present invention has resulted from envisaging the advantage derivable from the deliberate introduction of means suitably to vary the quality of gas supplied as distinct from the quantity thereof.

It can have no application to continuous steady maximum output of gas-plant. It applies only where maximum possible power or other like demand alternates with lesser demands.

Taking as an example the case above of an internal combustion engine supplied by a producer it will be clear that the control which demands an increased supply of power is normally one demanding an increased supply of gas, whether it be a throttle-lever or accelerator pedal, a mechanical or electrical governor, a device of the nature of an accelerometer or some other form of control.

In any such plant a device necessitating, controlling or responding to the changing demand for power can be caused directly or indirectly, as it moves or responds, to increase the ratio of water/air supplied to the producer with increasing demand, and vice versa to reduce the said ratio as power demand falls off.

Preferably, the extent to which this water/air ratio can be varied covers the range of 0/1 to 1/0, that is, the ratio can be varied so as to produce either a pure air-gas or a pure water-gas or an air-water gas of any value between these extremes.

In this way a temperature and/or heat reserve can be built up during lowered demands and a temporary very notable increase in the calorific value of gas be made available when the demand is suddenly increased.

While controlling the water supply is one convenient method of carrying out the invention, it is clearly alternatively possible to control the air supply or both the water and air supplies in any appropriate manner.

It is found possible even substantially to cut off the air supply and temporarily to generate almost pure water-gas during a far from insignificant period of acceleration or excess power demand.

In the case of a transport vehicle which is steadily accelerated (apart from road, rolling or air, resistance) by a given power and has also momentum, it must be immediately obvious how considered suitably timed improvement in gas quality can improve its overall performance.

The improvement in gas quality is of two-fold benefit for not merely is richer gas made but also less diluent nitrogen accompanies it.

Continuing the case of a vehicle as a convenient example, a typical simple arrangement according to the invention is to link the accelerator or some condition affected by it with a control of the supply of water (in whatever state) to the producer in such a way that as the accelerator is moved to open the throttle the water supply is started or increased. There must however be in gas-plants of usual design a very definite disparity between the amounts of water used during (and for some little time after) moving of the accelerator and the quality supplied while the accelerator is held in a fixed position indefinitely, unless on the one hand fuel is to be wasted unnecessarily or on the other the gas is to be debased by continued use of excess of water.

Preferably therefore a time-lag device is used so that although the permanent ratio water/air can be adjusted as required to give the best results at any accelerator position it is desired to maintain for extended periods nevertheless temporary disproportionate increase or decrease of the said ratio is available not merely as and when the accelerator is moved but for some little time thereafter.

The velocity of the accelerator movement and momentum resulting therefrom can similarly be used to accentuate the relative disproportion of the temporary changes.

It must be noted that the invention envisages from one point of view a deliberate impoverishment of gas under light or normal demands so as to establish a reserve of temperature capable of maintaining an endothermic reaction if necessary for limited periods of sudden excessive demand. Even so, especially where high temperatures of gas-making are employed, it is not necessary at any time to make gas much below the optimum quality for continuous running. Hence for the best results it is preferable to fit a time-lag or momentum device as already described.

In a transport vehicle a simple method is to allow to the accelerator travel beyond that necessary fully to open the engine throttle or to close it to the idling position, and in the excess of travel to allow for disproportionate admission of exclusion of water, the normal instinctive movement of the driver of a vehicle accelerating and decelerating giving a sufficient control in this particular case.

Various other objects and advantages will be apparent from the detailed description of embodiments of the invention which follows, and the novel features will be pointed out in the claims.

Figure 2:
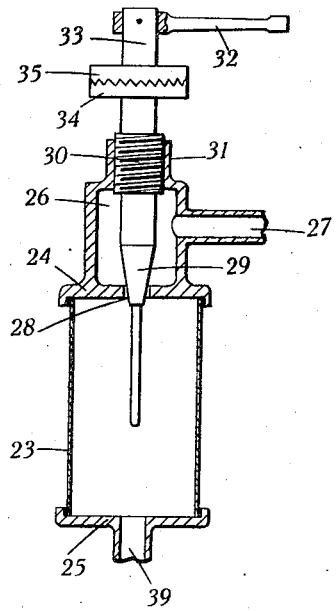
Figure 5:
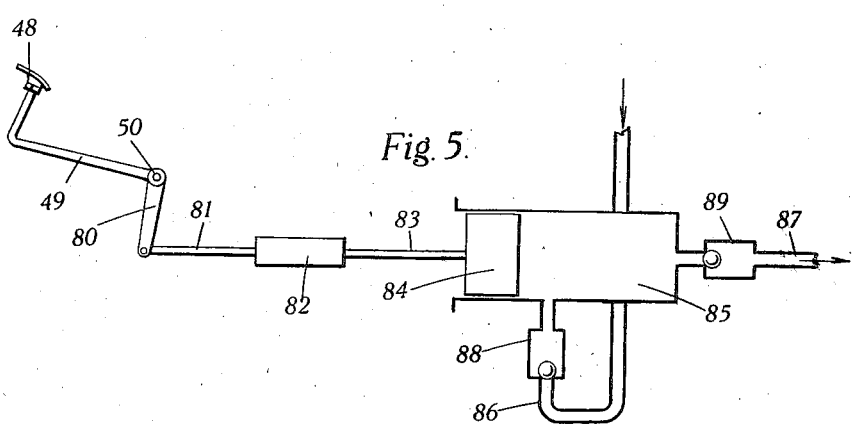
Figure 4:
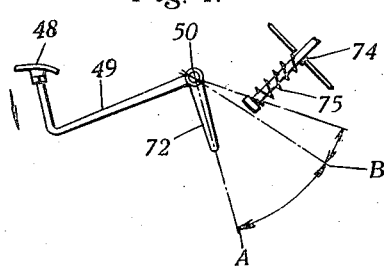

In the drawings,

Fig. 1 represents, somewhat schematically, an arrangement in accordance with the invention suitable for use on a road vehicle, Fig. 2 represents to a larger scale, a cross-section of the drip-feed shown in Fig. 1, Fig. 3 represents, in cross-section, a suitable form of tuyère, Fig. 4 represents, schematically one form of additional control for the water supply, and Fig. 5 represents schematically another form of supplementary control for the water supply.

Figure 6:
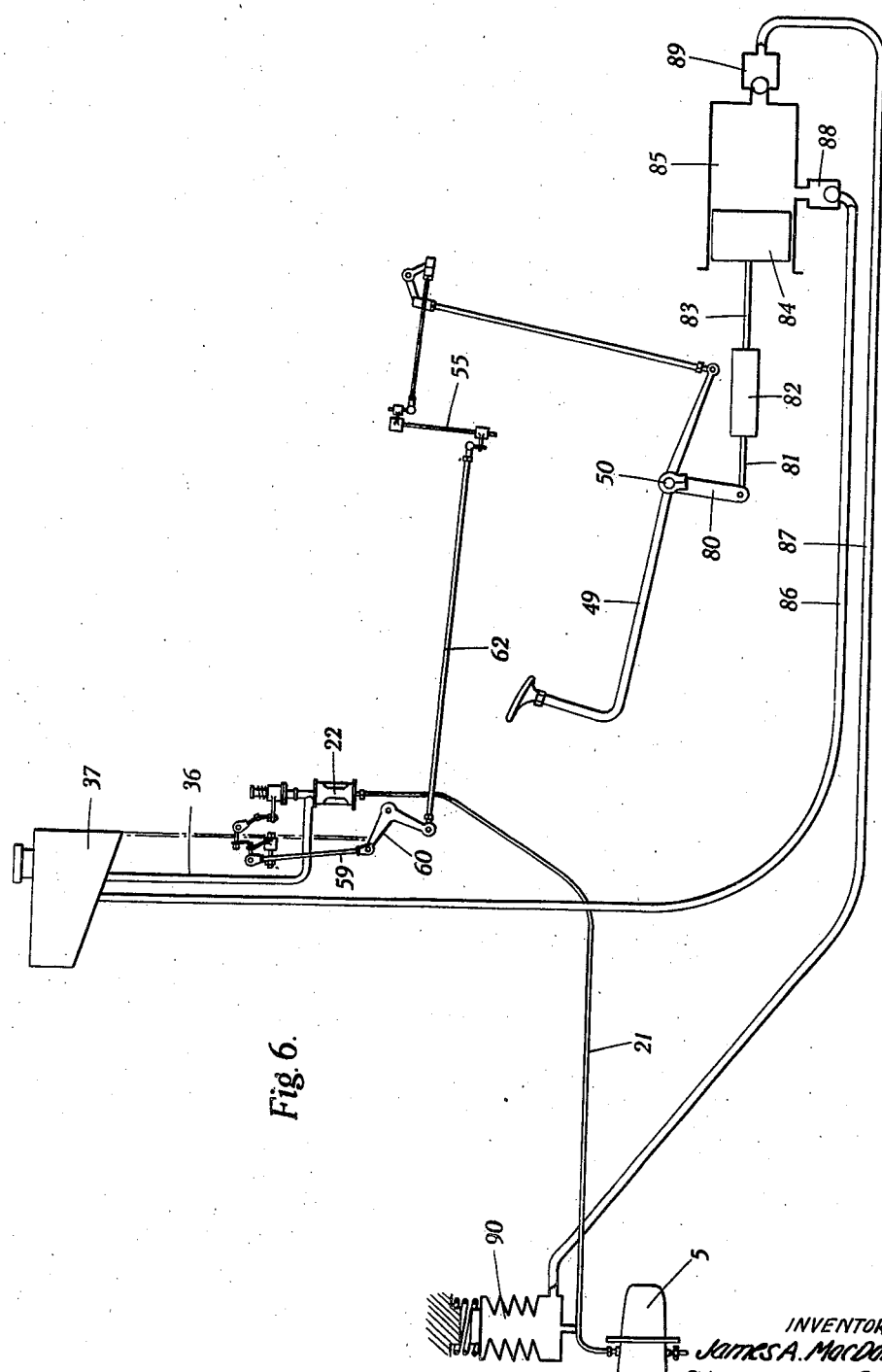

Fig. 6 is a diagrammatic illustration of the water feed device applied to the regular water feed regulator.

Referring to Fig. 1 a gas-producer 1 is mounted on the chassis 2 of a road vehicle. The producer 1 is provided with a hopper 3 containing a supply of fuel such as charcoal, access to the hopper being provided by a readily removable cover 4.

Gas produced in the producer 1 is led to a gas-engine 40 (which may be of any suitable design) by a pipe 41. This pipe is connected at one end to the outlet 42 of the producer and at the other end to the gas inlet 43 of a chamber 44 to which the air for combustion in the engine is also admitted through the pipe 45. The air inlet is controlled by valve means 46. The gas and air mix in the chamber 44 and pass into the engine 40 under the control of a throttle valve 47.

Both the air inlet valve 46 and the throttle valve 47 are movable at the will of the driver by means of the accelerator pedal 48. This pedal is mounted at one end of a pedal lever 49, mounted on a cross-shaft 50 suported by the chassis and the other end of this lever is connected by a link 51 to one arm of a bell-crank 52, mounted on the shaft 53 of the air inlet valve 46. The other arm of this bell-crank 52 is connected by a link 54 to the spindle 55 of the throttle valve 47.

Air is supplied to the producer through a water-cooled tuyère 5 which is shown in more detail in Fig. 3. The tuyère 5 is formed with a flange 6 by which it is attached to the producer wall.

The tuyère is of gradually diminishing cross-section and has a surrounding water jacket 7 to which cooling water is admitted by the inlet 8, and passed out through the outlet 9.

The entrance to the tuyère 5 is surrounded by a cylindrical tube 10 having an inturned annular rim 11 leaving a central aperture 12. This aperture is closed by a flap 13 pivoted at 14 and urged to the closed position by a weight 15.

The flap 13 is lifted by suction tending to draw air into the furnace and allows air to pass in through the aperture 12. The extent of opening and therefore the quantity of air supplied is clearly dependent on the amount of suction and will vary automatically therewith.

Water is supplied to the air passing through the tuyère 5 through a passage formed in the wall of the tuyère for example by drilling intersecting holes 17, 18 and 19 and plugging the outer end of the hole 18 by a plug 20. A pipe 21 is connected at one end to the inlet of the water feed passage and supplies water to the producer from the sight drip feed 22 shown in more detail in Fig. 2.

The sight drip feed comprises a cylindrical tube 23 of glass or other transparent material held between a top member 24 and a bottom member 25. The top member 24 is formed with a chamber 26 having an inlet 27 and communicating with the interior of the tube 23 by an aperture 28. This aperture is partially obturated by a tapered plug 29 which can be moved axially to vary the extent to which the aperture 28 is obturated.

The tapered plug 29 has a portion 30 threaded with a thread of large pitch. The top member 24 has a boss 31 in line with the aperture 28 and this boss is internally threaded with a thread of the same pitch as the portion 30, with which it engages. By rotating the tapered plug 29, it is also moved axially to open or close the aperture 28, the actual extent of opening depending on the position of the plug 29 and the angle of taper of this plug which are so set that the ratio of water to air is increased as the throttle is opened.

A member 33 is coaxial with the plug 29 and rotates the latter through a coupling comprising serrated discs 34, 35 rigid with the plug 29 and the member 33 respectively. This coupling permits the initial adjustment of the plug 29 (and therefore of the opening of the aperture 28) by separating the members 34 and 35 and rotating them relatively to one another. The initial adjustment of the plug 29 may be such as to close completely the aperture 28.

The inlet 27 to the chamber 26 is connected by a pipe 36 to a water supply tank 37 which may be mounted on the top of the dashboard 38 of the vehicle.

The bottom member 25 is formed with an outlet 39 which is connected to the pipe 21 leading to the tuyère 5.

The rate at which water drips through the aperture 28 and therefore the rate at which water is fed to the tuyère is controlled by the position of the accelerator pedal 48. The member 33 has a lever 32 rigidly fixed to it and this lever is connected by a link 56 to one arm of a bell-crank 57 pivoted at 58 to the dashboard. The other arm of the bell-crank is connected by a link 59 to another bell-crank 60 pivoted to the dashboard at 61 which is in turn connected by a link 62 to a lever 63 rigidly fixed to the spindle 55 of the throttle valve. As explained above this spindle 55 is connected by link mechanism to the accelerator pedal 48.

When the engine is idling, the accelerator pedal 48 will not be depressed and the tapered plug 29 of the sight drip-feed will be so positioned that the rate at which water is fed into the tuyère is a minimum, even down to zero. As the accelerator pedal is depressed to enable the engine to take a greater load, the tapered plug 29 will be moved by the link mechanism described above so as disproportionately to increase the rate at which water is fed into the tuyère. The quality of the gas produced in the producer is thus improved since the water to air ratio is increased and the ability of the engine to meet an increased demand is thereby improved.

The supply of air to the producer is also controlled in accordance with the demand on the engine the flap 13 in the tuyère opening more or less as the suction of the engine increases or decreases.

It will be clear that many other arrangements may be devised for carrying out the method of the invention. The flap 13, for example, might be linked to the accelerator pedal or some other device controlling or responsive to the power demand and be opened or closed in accordance with the operation of this device.

A modified method of controlling the water supply to the producer, preferably used in conjunction with the method of control described above, is shown diagrammatically in Fig. 4. The accelerator pedal 48 is mounted at one end of a pedal lever 49 which as described above is mounted on the cross-shaft 50 supported by the chassis. The cross-shaft 50 has mounted thereon an extension arm 72 which moves in accordance with the movement of the pedal 48. Normal movement of the pedal 48 moves the extension arm 72 within the arc A—B and operates the throttle and drip-feed in the normal manner as for example shown in Figs. 1 to 3.

A rod 74 is connected through conventional link mechanism to the drip-feed described above. This rod is spring-pressed by means of the spring 75 and is so positioned that when the pedal 48 is depressed beyond the position at which the throttle reaches its fully open position, the arm 72 engages the rod 74 and moves it to operate the drip feed further to increase the rate at which water is supplied to the producer, the throttle opening preferably remaining constant.

During normal demands for power, the quantity of gas supplied to the engine is controlled by the movement of the pedal 48. On an abnormal or heavy demand for power, the pedal 48 is depressed to an abnormal extent and water is supplied to the producer at an increased rate so that gas of improved quality is supplied to the engine to enable it to meet the abnormal or heavy demand.

Another modified form of control of the water supply is shown diagrammatically in Fig. 5, this control being preferably used in addition to that described with reference to Figs. 1 to 3. The lever 49 of the accelerator pedal 48 is mounted on the cross-shaft 50 and a lever 80 is also mounted on this cross-shaft so as to move in accordance with the movement of the pedal 48. The lever 80 is connected by a link 81 and an adjustable dash-pot 82 to a rod 83 which is fixed to a piston 84.

The piston 84 is slidable within a cylinder 85 which has an inlet pipe 86 leading to the water tank and an outlet pipe 87 which leads to the tuyère of the producer. The pipe 87 may lead into the pipe 21 which supplies water normally to the tuyère. Both the inlet pipe 86 and the outlet pipe 87 are provided with non-return valves 88 and 89 respectively.

Depression of the accelerator pedal, as well as causing a disproportionate increase in the supply from the drip-feed as described with reference to Figs. 1 to 3, causes the piston 84 to move in the cylinder 85 and force the water contained in this cylinder past the non-return valve 89 and thence to the tuyère. This extra injection of water provides the disproportionate increase of the water/air ratio which is desirable as the accelerator is moved. The effect can be maintained if necessary by the driver moving the pedal up and down slightly or by the insertion of any common form of elastic reservoir (in a manner too obvious to require special illustration or description) in the pipe 87 it can be ensured that additional water continues to be fed to the producer for a desired period after the pedal has come to rest.

The dash-pot 82 permits the piston 84 to move back to its original position under the pressure of water in the tank without affecting the position of the accelerator pedal.

Obviously if water is to be used in the form of steam rather than as liquid water the supply of steam under pressure can be similarly controlled.

The invention is therefore not restricted to the details of the specific arrangements described above but includes such modifications as come within the ambit of the accompanying claims.

I claim:

1. A power plant comprising a gas producer, a gas engine, means for causing a disproportionate variation in the ratio of water to air supplied to the engine, whilst the engine is adjusting itself to a change in power demand and means for thereafter maintaining the ratio of water to air at a value appropriate to the new demand.

2. A power plant comprising a gas producer, a gas engine, means controlled by a throttle for supplying gas from the producer to the engine, means for supplying water to the producer, means for controlling the rate at which water is supplied to the producer in accordance with the position of the throttle, and means for temporarily increasing the rate at which water is supplied to the producer during movement of the throttle to increase the supply of gas to the engine.

3. A power plant comprising a gas producer, a gas engine, means for supplying water to the producer, means for supplying air to the producer, means for controlling the water supply to the producer so as to vary the water/air ratio in accordance with the torque of the engine, and a device operated by engine suction controlling the means for supplying air to the producer, the response of this device to suction becoming less as the air supply increases.

4. A power plant as claimed in claim 3 in which the device controlling the air supply to the producer comprises a loaded flap valve.

5. A power plant comprising a gas producer, a gas engine, means controlled by a throttle for supplying gas from the producer to the engine, means for supplying water to the producer and means responsive to abnormal movement of the throttle for temporarily increasing the supply of water to the producer, to increase the water/air ratio of the mixed air and water supplied to the producer.

6. A power plant comprising a gas producer, a gas engine, a throttle controlling the torque of the engine, means to supply water to the producer, said means being linked to the throttle and giving a water supply which at full throttle opening is insufficient to cool the producer, means controlling the throttle and having a range above full throttle opening and means for supplying additional water to the producer operated during this special range.

7. A power plant comprising a gas producer, a gas engine, a throttle controlling the torque of the engine, means linked to the throttle to supply water to the producer at a rate dependent on the throttle position and means temporarily to supply additional water to the producer actuated by movement of the throttle to increase its opening.

JAMES ALEXANDER MACDONALD.